(12) United States Patent
Falguiere et al.

(10) Patent No.: US 12,203,539 B2
(45) Date of Patent: Jan. 21, 2025

(54) COMPACT ACCESSORY GEARBOX COMPRISING AN INTEGRATED ELECTRIC MACHINE

(71) Applicant: SAFRAN TRANSMISSION SYSTEMS, Colombes (FR)

(72) Inventors: Clément Falguiere, Moissy-Cramayel (FR); Clément Romain Aimé Cadet, Moissy-Cramayel (FR); Florian Pierre-Yves Chaput, Moissy-Cramayel (FR); Raphaël Clément Stéphane Martin, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/470,606

(22) Filed: Sep. 20, 2023

(65) Prior Publication Data

US 2024/0093773 A1    Mar. 21, 2024

(30) Foreign Application Priority Data

Sep. 20, 2022   (FR) ...................................... 2209462

(51) Int. Cl.
*F16H 57/021*      (2012.01)
*F02C 7/32*        (2006.01)
(Continued)

(52) U.S. Cl.
CPC ............. *F16H 57/021* (2013.01); *F02C 7/32* (2013.01); *F16H 1/22* (2013.01);
(Continued)

(58) Field of Classification Search
CPC .......... F02C 7/32; F02C 7/36; F05D 2220/50; F16C 2360/23; F16C 2360/24; F16H 57/021; F16H 2057/02034; H02K 7/116
See application file for complete search history.

(56) References Cited

U.S. PATENT DOCUMENTS 10,787,967 B2 *   9/2020  Gieras ..................... F01D 15/10
2009/0309461 A1  12/2009  Berenger et al.
(Continued)

FOREIGN PATENT DOCUMENTS

CA       2767449 C    *  7/2019  ............. F01D 15/10
FR     2 897 895 A1      8/2007
WO   WO-2022189153 A1 *  9/2022  ............. B64D 35/00

OTHER PUBLICATIONS

France Search Report mailed Apr. 6, 2023, issued in Application No. FR 2209462, filed Sep. 20, 2022, 2 pages.

*Primary Examiner* — Bobby Rushing, Jr.
(74) *Attorney, Agent, or Firm* — CHRISTENSEN O'CONNOR JOHNSON KINDNESS PLLC

(57) ABSTRACT

An accessory gearbox houses at least one gear train with a series of pinions. The casing has two substantially flat and opposite parallel side walls between which are mounted support shafts for each of the pinions, each of which receives accessories, and which define in the enclosure an internal volume surrounding a shaft supporting at least one hybridization pinion. The gearbox receives at least one electric machine having a rotor and a stator, wherein the rotor of the electric machine is supported by the shaft supporting the hybridization pinion of the gear train, and the stator extends around the rotor in the internal volume.

10 Claims, 6 Drawing Sheets

(51) Int. Cl.
*F16H 1/22* (2006.01)
*F16H 57/02* (2012.01)

(52) U.S. Cl.
CPC ............... *F05D 2260/4031* (2013.01); *F16H 2057/02026* (2013.01); *F16H 2057/02034* (2013.01); *F16H 2057/02082* (2013.01)

(56) References Cited

U.S. PATENT DOCUMENTS

2011/0284328 A1   11/2011   Brandt et al.
2015/0311770 A1   10/2015   Goi et al.

* cited by examiner

COMPACT ACCESSORY GEARBOX COMPRISING AN INTEGRATED ELECTRIC MACHINE

CROSS-REFERENCE TO RELATED APPLICATION

This application claims priority to FR 2209462, filed Sep. 20, 2022, the disclosure of which is hereby expressly incorporated by reference herein in its entirety.

TECHNICAL FIELD

The disclosure relates to the field of turbomachines for aircraft, and in particular to that of accessory gearboxes fitted to such turbomachines.

BACKGROUND

The prior art is known from the documents US 2009/309461 A1, US 2011/284328 A1 and US 2015/311770 A1.

An aircraft turbomachine, such as a double-flow turbomachine, generally comprises a ducted fan arranged at the inlet of the turbomachine, and which is driven in rotation by a low-pressure shaft. In certain high bypass ratio turbomachine configurations, known as UHBRs (Ultra High Bypass Ratio), a reduction gear can be interposed between the fan and the low-pressure shaft so that the fan rotates at a speed lower than that of the low-pressure shaft. Reducing the speed also enables the size of the fan to be increased, allowing high bypass ratio to be achieved.

The turbomachine comprises an accessory gearbox (AGB) to power various equipment or accessories needed to operate the turbomachine or the aircraft. An example of a classic accessory is a permanent magnet alternator (usually referred to as a PMA), that ensures the production of electrical current, typically using the accessory gearbox. In particular, the alternator is designed to supply an electrical power to the turbomachine computer such as the FADEC (Full Authority Digital Engine Control) from an idle speed.

The accessory gearbox consists of a series of gear trains driving the equipment at different speed ratios. The coupling of the accessory gearbox to the turbomachine is conventionally carried out by means of a radial shaft which is coupled to the rotor of the high-pressure compressor, which drives a transfer shaft coupled to the accessory gearbox by means of a transfer gearbox known by the acronym TGB.

The hybrid propulsion is a key area of development for reducing the carbon footprint of air transport. Combining thermal energy with electrical energy not only reduces fuel consumption and therefore CO2 emissions, but also reduces noise pollution and improves propulsion safety in the event of failure of the thermal part of the turbomachine.

The application of hybridization is likely to take different forms on aircraft, but generally requires the integration of more and more electrical equipment in accessory gearboxes, and in particular not just alternators but also electric machines configured to supply motive power.

This need for new equipment poses problems in terms of the overall dimensions of accessory gearboxes, as the equipment fitted to an accessory gearbox is generally secured to the casing on two parallel, substantially flat, opposite side walls, between which are mounted the support shafts for each of the pinions of the gear train. As a result, the addition of a new outer equipment such as an electric machine increases the overall dimensions of the accessory gearbox, in particular, in terms of axial dimensions. This increase in the overall dimension is all the more detrimental given that current developments in the location of the accessory gearboxes are aimed at locating them in line with the central area of the turbomachine, where the available space is reduced, rather than in line with the fan. The compactness of accessory gearboxes and their equipment is therefore becoming a priority, and it is increasingly desirable to integrate the equipment inside the casing of the accessory gearbox.

In particular, an electric machine is a particularly bulky accessory. For the record, an electric machine is an electromechanical device based on electromagnetism that converts electrical energy into mechanical energy (motor mode) or, in a reversible manner, enabling the production of electricity from mechanical energy (generator mode). The electric machine can switch from the generator mode to the motor mode, and vice versa, depending on how it is controlled.

The document FR-2 897 895 A1 proposes the integration of an electric machine of the starter-generator type made in two parts inside an accessory gearbox, the casing of which is modified to accommodate, on either side of a pinion, on the one hand a synchronous generator with a rotor forming a field and a stator forming an armature, and on the other hand an exciter with a stator forming a field and a rotor forming an armature connected to the field of the generator. The location of the starter-generator in this case means that the accessory gearbox no longer has flat side walls and considerably increases the axial dimensions of the accessory gearbox. In addition, the separation of the starter-generator into two parts, one on each side of the pinion, considerably increases the complexity of the assembling of the accessory gearbox.

As a result, there is currently no accessory gearbox that can accommodate an electric machine in a compact space. Such equipment is not fully integrated into the AGB. So, there's a real need for an electric machine that is compactly integrated into the AGB.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The disclosure proposes to meet this need by providing an accessory gearbox that takes advantage of an internal volume to house an electric machine.

To this end, the disclosure proposes an accessory gearbox for an aircraft turbomachine, the gearbox comprising a casing defining an enclosure which houses at least one gear train comprising a series of pinions, the casing comprising two substantially flat and opposite parallel side walls between which are mounted shafts supporting each of the pinions of the gear train, the side walls of the casing each receiving accessories which each comprise a shaft passing through one of the walls and which is coupled to the shaft supporting one of the pinions of the gear train, and one of the side walls being able to be passed through by a transfer shaft of a power transmission device of the turbomachine which is coupled to a shaft supporting one of the pinions of the gear train, the side walls of the casing delimiting in the enclosure, an internal volume which surrounds a shaft supporting at least one pinion referred to as the hybridization pinion, the shaft also being surrounded by an electric machine, characterised in that a rotor of the electric machine is supported by the shaft supporting the hybridization pinion of the gear train and in that a stator of the electric machine extends around the rotor and is mounted within the enclosure in the internal volume.

The accessory gearbox in accordance with the disclosure therefore conventionally has two flat parallel side walls and it is between these walls that the electric machine is housed. It therefore comprises no protuberances that could alter its compactness.

Other characteristics of the gearbox include:

the shaft of the hybridization pinion is mounted so as to rotate in the casing between two bearings each supported by one of the side walls and comprises a first section receiving the hybridization pinion, arranged close to a first of the bearings, and a second section which extends between the hybridization pinion and a second opposite bearing, the rotor being secured to the second section, the second section of the shaft is in one piece with the first section, the hybridization pinion comprises a web which has a diameter greater than the second section of the shaft of the hybridization pinion and which supports, at its external periphery, meshing toothing, and the rotor extends axially from the web towards the second bearing, an outer surface of the rotor arranged in a recess from a free end of the shaft receiving an inner ring of the bearing, rotational connection means are interposed between an internal bore of the rotor and the second section of the shaft of the hybridization pinion, the hybridization pinion comprises a tubular section which extends from its web towards the adjacent side wall, and which comprises at its end a first end collar receiving at least one inner ring of one of the bearings, the shaft supporting the hybridization pinion is tubular and comprises a bore which is coaxial with an orifice formed in one of the adjacent side walls, the bore comprising internal splines for coupling with a shaft of one of the accessories secured to the adjacent wall, the hybridization pinion is an intermediate pinion in the gear train, an external face of one of the side walls supports a tubular sheath which is adapted to surround and be passed through by the transfer shaft, and comprises an additional electric machine which is mounted within the sheath, a stator of the additional electric machine is secured in the sheath and a rotor of the additional electric machine is secured to the transfer shaft, the stator of the additional machine being mounted around the rotor of the additional electric machine.

The disclosure also relates to an aircraft turbomachine comprising a power transmission device comprising:

a substantially radial drive shaft securely mounted to rotate with a main shaft of the turbomachine, a transfer gearbox coupled to the drive shaft, a transfer shaft coupled to the transfer gearbox, characterised in that it comprises an accessory gearbox of the type described above which is coupled to the transfer shaft.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosed subject matter.

Figure 1:
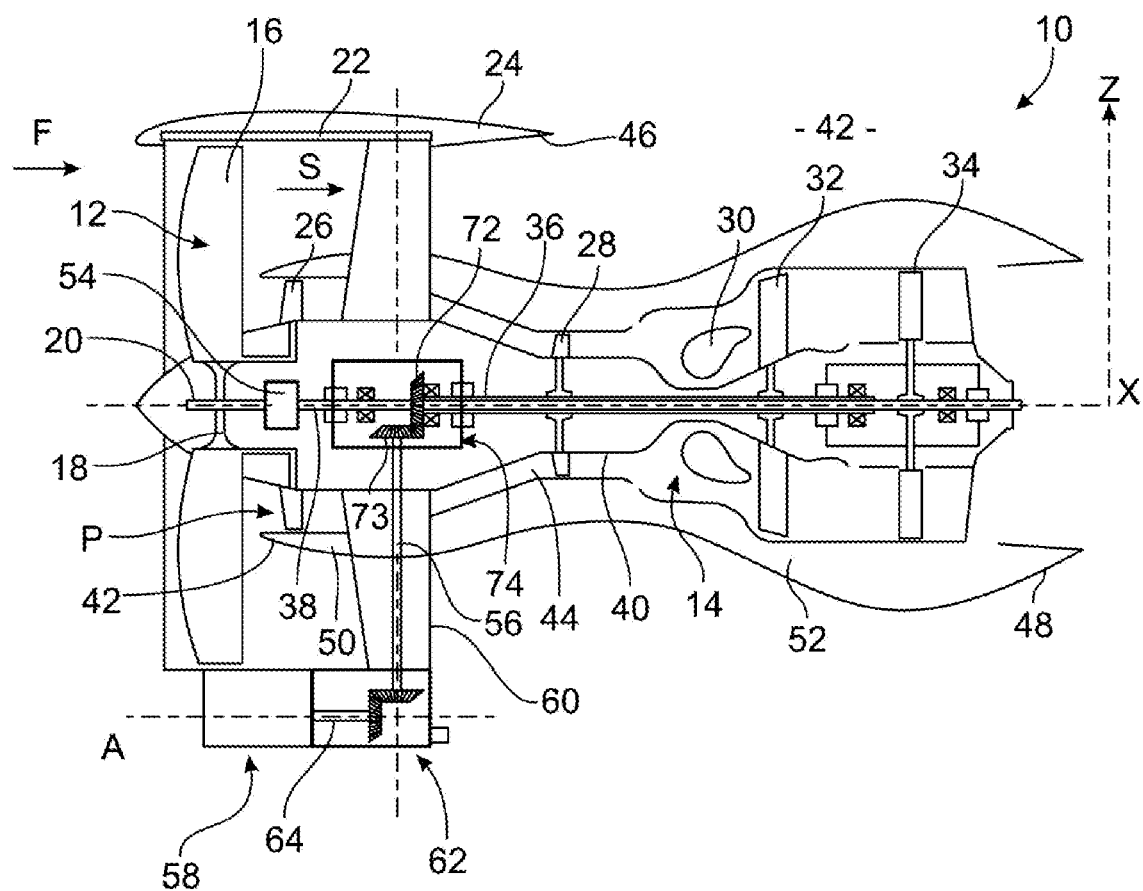
FIG. 1 is a cross-sectional schematic view of a turbomachine comprising an accessory gearbox.

FIG. 1 shows a turbomachine 10 of longitudinal axis X to which the disclosure applies. The turbomachine 10 shown here is a double-flow, double-body turbomachine designed to be mounted on an aircraft. Of course, the disclosure is not limited to this type of turbomachine.

In the present application, the terms "upstream", "downstream", "axial" and "axially" are defined with respect to the orientation of circulation of the gases in the turbomachine and also along the longitudinal axis (and even from left to right in FIG. 1). The terms "radial", "radially", "internal", and "external" are also defined with respect to a radial axis Z that is perpendicular to the axis X of the turbomachine.

This double-flow and double-body turbomachine 10 comprises a fan 12 that is mounted upstream of a gas generator or gas turbine engine 14. The fan 12 comprises a plurality of fan blades 16 that extend radially from the periphery of a disc 18 through which a fan shaft 20 passes. The fan 12 is surrounded by a fan casing 22 centered on the longitudinal axis X. The fan casing 22 is supported by a nacelle 24 which extends around the gas generator 14 along the longitudinal axis X.

The gas generator 14 comprises, from upstream to downstream, a low-pressure (LP) compressor 26, a high-pressure (HP) compressor 28, a combustion chamber 30, a high-pressure turbine 32 and a low-pressure turbine 34. The rotor of the HP compressor 28 is connected to the rotor of the turbine 32 via an HP shaft 36 centered on the longitudinal axis to form a first body referred to as high-pressure body. The rotor of the LP compressor is connected to the rotor of the LP turbine via a LP shaft 38 centered on the longitudinal axis to form a second body referred to as low-pressure body. The LP shaft 38 extends inside the HP shaft 36. The HP shaft 36 is a motor shaft, which is driven in rotation along the longitudinal axis X in an internal casing 40 centered on the longitudinal axis.

An air flux F entering the turbomachine via the fan 12 is divided by a splitter nose 42 of the turbomachine into a primary air flux P which passes through the gas generator 3 and in particular in a primary duct, and a secondary air flux S which circulates around the gas generator 14 in a secondary duct 42. The primary duct 44 and the secondary duct 42 are coaxial. The secondary air flux S is ejected by a secondary nozzle 46 terminating the nacelle 24, while the primary air flux P is ejected outside the turbomachine via an ejection nozzle 48 located downstream of the gas generator. The primary duct 44 is delimited at least partly, radially, by the internal casing 40 and by an inlet casing 50. The secondary duct 42 is delimited at least partly, radially, by the inlet casing 50 and the fan casing. The inlet casing 50 supports the splitter nose 42 upstream and is extended downstream by an inter-duct casing 52 which supports the ejection nozzle 48.

In an optional configuration, a speed reduction gear 54 can connect the LP shaft 38 to the fan shaft 20, to allow the speed of the fan 12 to be reduced to a lower speed than that of the LP shaft 38. The speed reduction gear 54 also allows a fan 12 with a large diameter to be arranged so as to increase the bypass ratio. The bypass ratio of the fan 12 is advantageously greater than 10. Preferably, the bypass ratio is between 15 and 20. The speed reduction gear can be either of planetary train or epicyclic train.

The turbomachine 10 comprises a substantially radial drive shaft 56 which is connected, on the one hand, to the high-pressure shaft 36 forming the main shaft of the turbomachine and, on the other hand, to an accessory gearbox 58 of the turbomachine. The drive shaft 56 extends substantially radially, i.e., at an angle of between 0° and 30° with respect to the radial axis Z, i.e., between 60° and 90° to the longitudinal axis X. This drive shaft enables the motor shaft, in this case the HP shaft 36, to be driven in rotation so that the turbomachine can be started via an item of equipment or accessory cooperating with the accessory gearbox which will be described below.

In this example, the drive shaft 56 is referred to as a radial shaft because it extends substantially radially, being housed in a structural element of the turbomachine. This structural element extends substantially radially between the internal casing 40 and the fan casing and/or the nacelle 24. The structural element is a casing arm 60 which structurally connects the internal casing 40 to the fan casing. At its end, the drive shaft 56 is received in a transfer gearbox 62 in which it is coupled by meshing with a transfer shaft 64, with axis A substantially parallel to axis X, which is itself coupled to the accessory gearbox 58.

Figure 2:
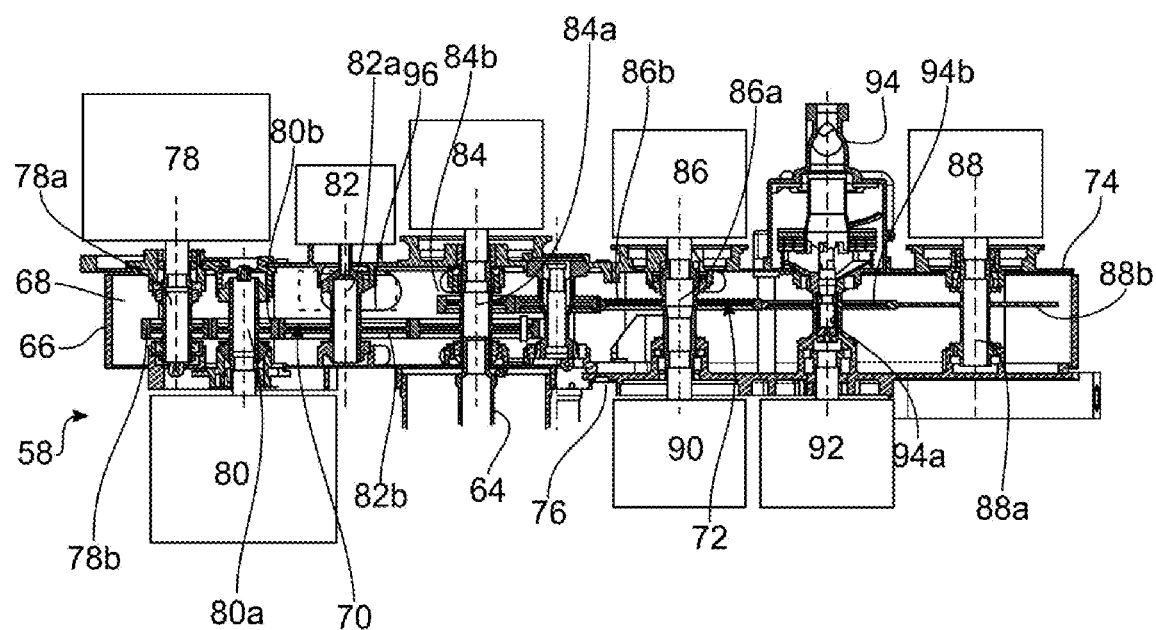
FIG. 2 is a cross-sectional schematic view of an accessory gearbox in the prior art.

The accessory gearbox 58 is located in a compartment of the nacelle 24. FIG. 2 shows a known accessory gearbox 58, which houses various items of equipment or accessories for the turbomachine.

This equipment, mounted on the gearbox 58, may include fuel pumps, electric generators, a lubrication unit, a starter motor, hydraulic pumps, etc.

The gearbox 58 conventionally comprises a casing 66 defining an enclosure 68 housing here at least one gear train comprising a series of pinions, and more particularly here two gear trains 70 and 72. The casing 58 comprises two substantially flat parallel side walls 74 and 76 opposite each other, between which are mounted support shafts for each of the pinions of the gear train.

The transfer shaft 64, shown in part in FIG. 2, draws or provides mechanical power to the HP shaft 36. The transfer shaft 64 is coupled to the two gear trains 70, 72. The function of the two gear trains 70, 72 thus described is to drive in rotation a plurality of separate accessories secured to the walls 74, 76. For example, in a non-limiting manner of the disclosure, these accessories comprise two electrical generators 78, 80 for providing electrical power to the aircraft, an electric machine 82 for starting the engine or generating an electrical current, an electrical generator 84 for providing electrical current to or other engine equipment such as two hydraulic pumps 86, 88 for providing pressurised oil to the engine and/or its equipment, a main oil pump 90 for providing lubricating oil to the oil circuits of the engine and/or its equipment, a main fuel pump 92, and a centrifugal oil separator 94, which is a passive member.

Of course, it will be understood that this arrangement is provided by way of example only and is not limiting of the disclosure and that an accessory gearbox 58 according to the disclosure may comprise a different number of accessories.

The side walls 74, 76 therefore receive these accessories 78, 80, 82, 84, 86, 88, 90, 92 which each comprise a corresponding shaft passing through one of the walls 74, 76 and which is coupled to a corresponding shaft 78a, 80a, 82a, 84a, 86a, 88a, 90a, 92a supporting one of the pinions 78b, 80b, 82b, 84b, 86b, 88b, 90b, 92b of one of the gear trains 70 or 72. The transfer shaft 64 passes through the side wall 76 and is coupled to the shaft 84 supporting the pinion 84b of the gear train 70.

As shown in FIG. 2, the side walls 74, 76 delimit at least one internal volume 96 in the enclosure 68, shown here in dotted lines, which surrounds a shaft 82a supporting a pinion 82b. This internal volume 96 is arranged on one side of the pinion 82b.

As part of the hybridization of the accessory gearbox 58, the disclosure proposes to take advantage of such an internal volume 96 in an accessory gearbox 58 to house therein an electric machine 82. To this end, the electric machine 82 surrounds the support shaft 82a and the pinion 82b is referred to as the hybridization pinion.

Figure 3:
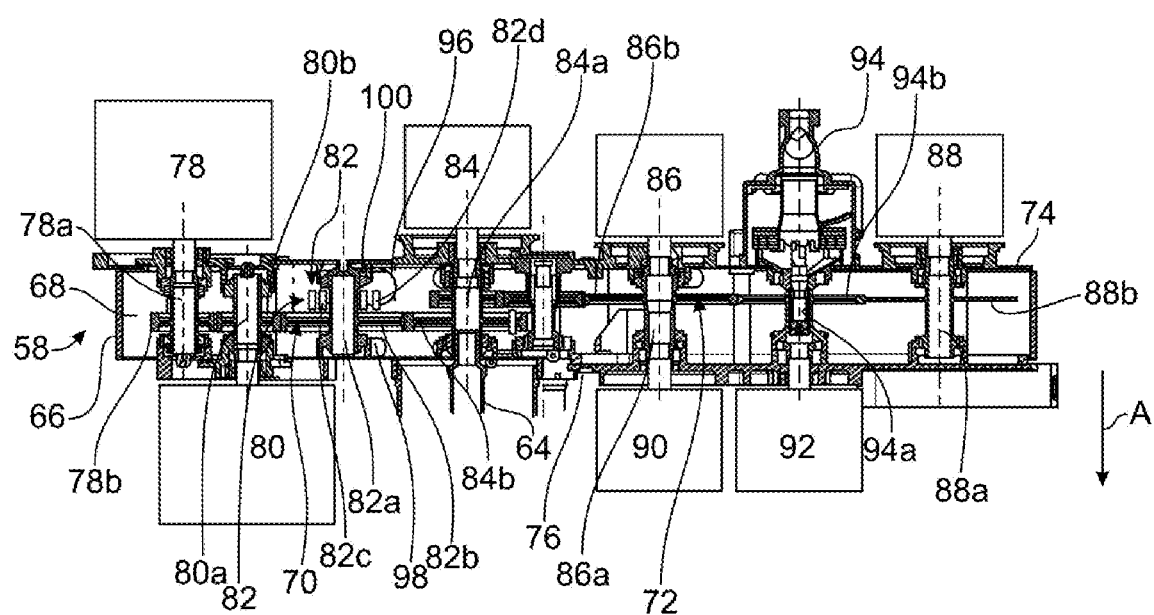
FIG. 3 is a cross-sectional schematic view of an accessory gearbox according to the disclosure.

This configuration is shown schematically in FIG. 3.

As before, the gearbox 58 houses an electric machine 82 comprising a rotor 82c and a stator 82d. However, unlike a gearbox 58 known in the art, the electric machine 82 is housed in the internal volume 96.

More particularly, the rotor 82c of the electric machine 82 is supported by the shaft 82a supporting the hybridization pinion 82b of the gear train 70 and the stator 82d extends around the rotor 82c and is mounted within the enclosure 68 in the internal volume 96.

In the configuration shown here, the hybridization pinion 82b is an intermediate pinion of the gear train 70, but it will be understood that this arrangement does not limit the disclosure.

This configuration is particularly advantageous because it provides an electric machine 82 which is no longer secured to the side wall 74 but is integrated into the casing 66. As a result, the gearbox 58 takes up less axial space along the axis A in the axis of the pinion 82b of the gear train 70. This configuration results in a gearbox 70 that takes up less space axially, which is particularly advantageous for a gearbox that needs to be positioned close to the central area of the turbomachine.

Alternatively (not shown), the integration of the electrical machine 82 inside the casing 66 enables the space previously used on the side face 74 to be freed up for positioning another accessory therein, thereby reducing the transverse dimensions of the gearbox 58.

Another advantage of such an arrangement is that, because it is positioned in the casing 66, the electric machine 82 can benefit from the internal lubrication of the casing 66, which is necessarily already present due to the presence of the gear trains 70, 72.

Figure 4:
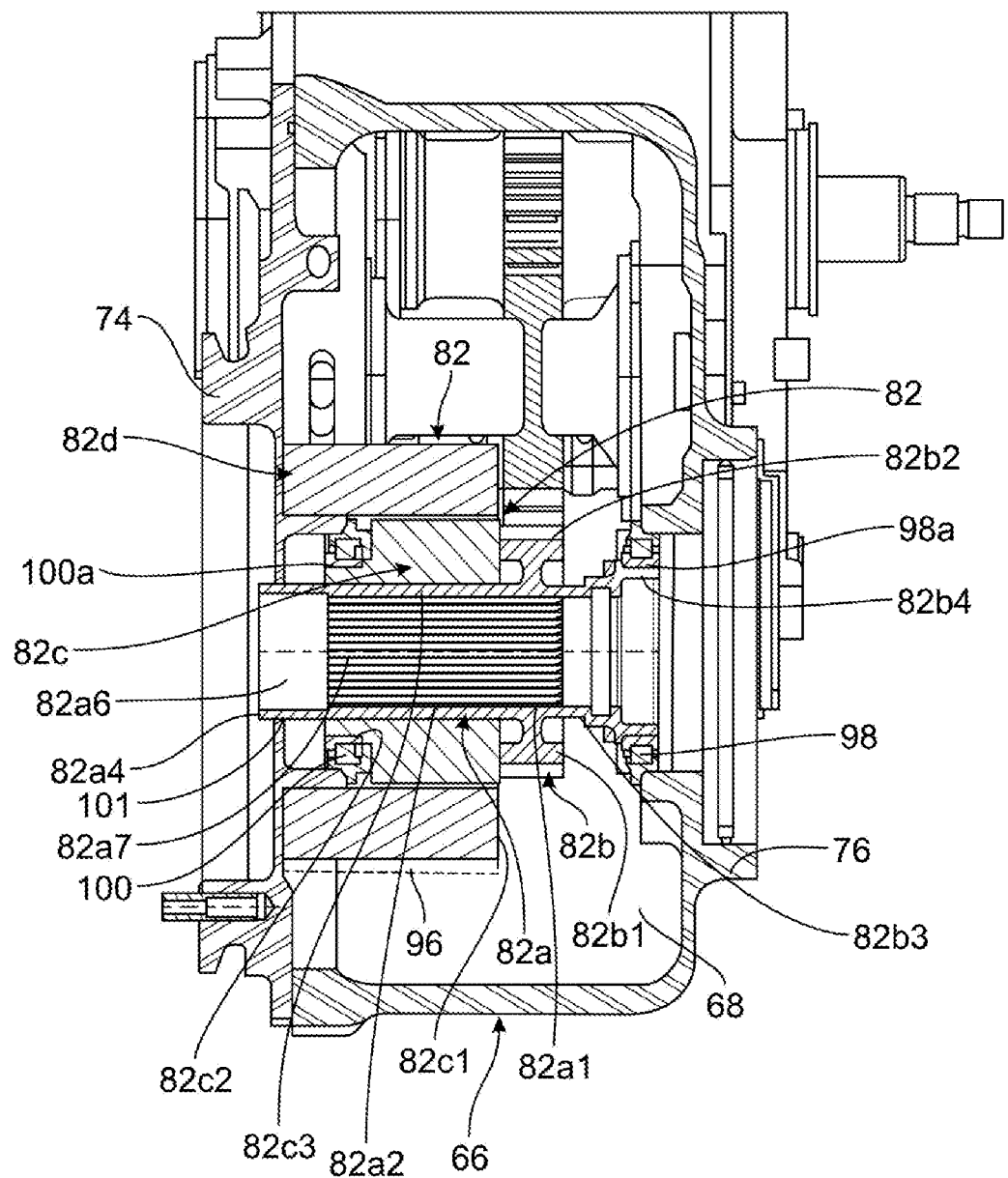
FIG. 4 is a cross-sectional view of the layout of the electric machine around the axis of the hybridization pinion.

FIG. 4 illustrates, in a non-limiting manner, an example of the mounting of such an electric machine 82.

As can be seen, the shaft 82a of the hybridization pinion 82b is mounted so as to rotate in the casing 66 between two bearings 98, 100 each supported by one of the side walls 74, 76. The shaft 82a comprises a first section 82a1 which comprises the hybridization pinion 82b, and which is arranged close to a first of the bearings, namely the bearing 98. It comprises a second section 82a2 which extends between the hybridization pinion 82b and the opposite second bearing 100. The rotor 82c is attached to the second section 82a2.

In the example shown here, the second section 82a2 of the shaft 82a is in one piece with the first section 82a1. The hybridization pinion 82b is therefore also in one piece with the shaft 82a.

The hybridization pinion 82b comprises a web 82b1 which has a diameter greater than the second section 82a2 of the shaft 82a of the hybridization pinion 82b and which on its external periphery supports a meshing toothing 82b2. A first face 82c1 of the rotor 82c is received in abutment against this web 82b1, and the rotor 82c extends substantially axially from the web 82b1 towards the bearing 100, and more particularly along a part of the second section 82a2 as far as an outer surface 82c2 of the rotor 82c which is arranged in a recess from a free end 82a4 of the shaft 82a and which receives an inner ring 100a of the bearing 100.

As a result, the hybridization pinion 82b, the shaft 82a and the rotor 82c can be assembled simply by slipping the rotor 82c directly onto the shaft 82a, abutting against the web 82b1 of the hybridization pinion 82b. The bearing 100 is then mounted on the rotor 82c and thus axially immobilises the rotor 82c between the bearing 100 and the web 82b1 of the pinion 82b.

It will be understood that rotational connection means will be interposed between an internal bore 82c3 of the rotor 82c and the second section 82a2 of the shaft of the determined pinion 82b.

The hybridization pinion 82b comprises a tubular section 82b3 which extends from its web 82b1 towards the adjacent side wall 76 and which comprises at its end a first end collar 82b4 receiving at least one inner ring 98a of the bearing 98.

The shaft 82a of the hybridization pinion 82b may be solid but preferably, as shown in FIG. 4, it is tubular and comprises a bore 82a6 which is coaxial with an orifice 101 formed in one of the adjacent side walls, here the wall 74, the bore comprising internal splines 82a7 for coupling with a shaft of one of the accessories (not shown) secured to the adjacent wall 74.

Figure 5:
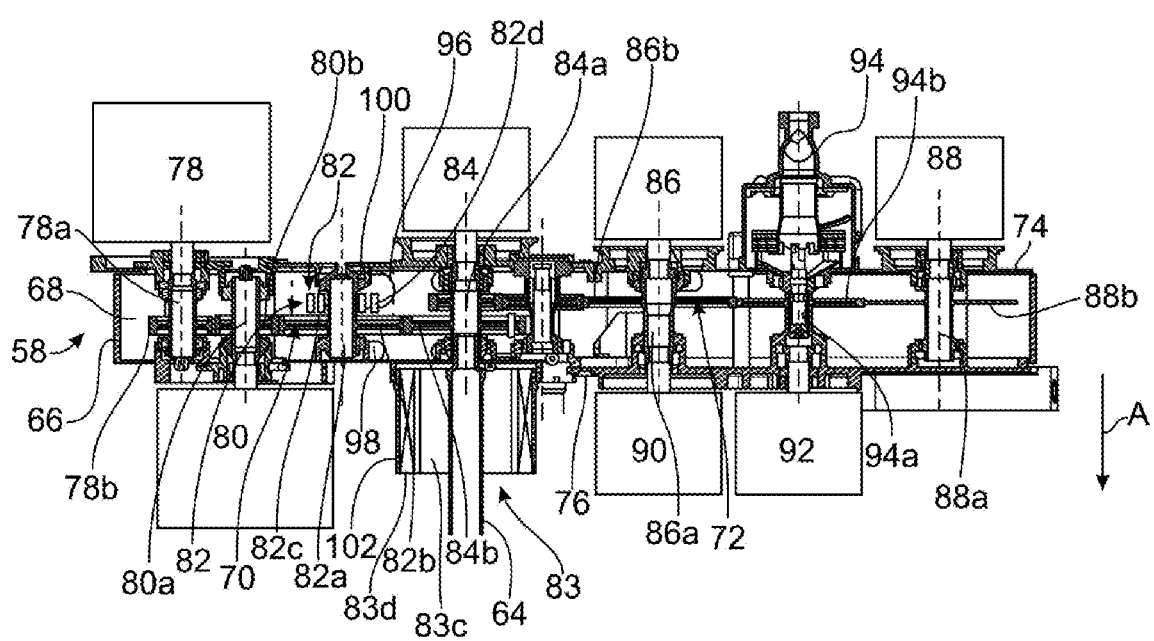
FIG. 5 is a schematic cross-sectional view of the layout of an additional electric machine in a sheath surrounding a transfer shaft coupled to the accessory gearbox.
Figure 6:
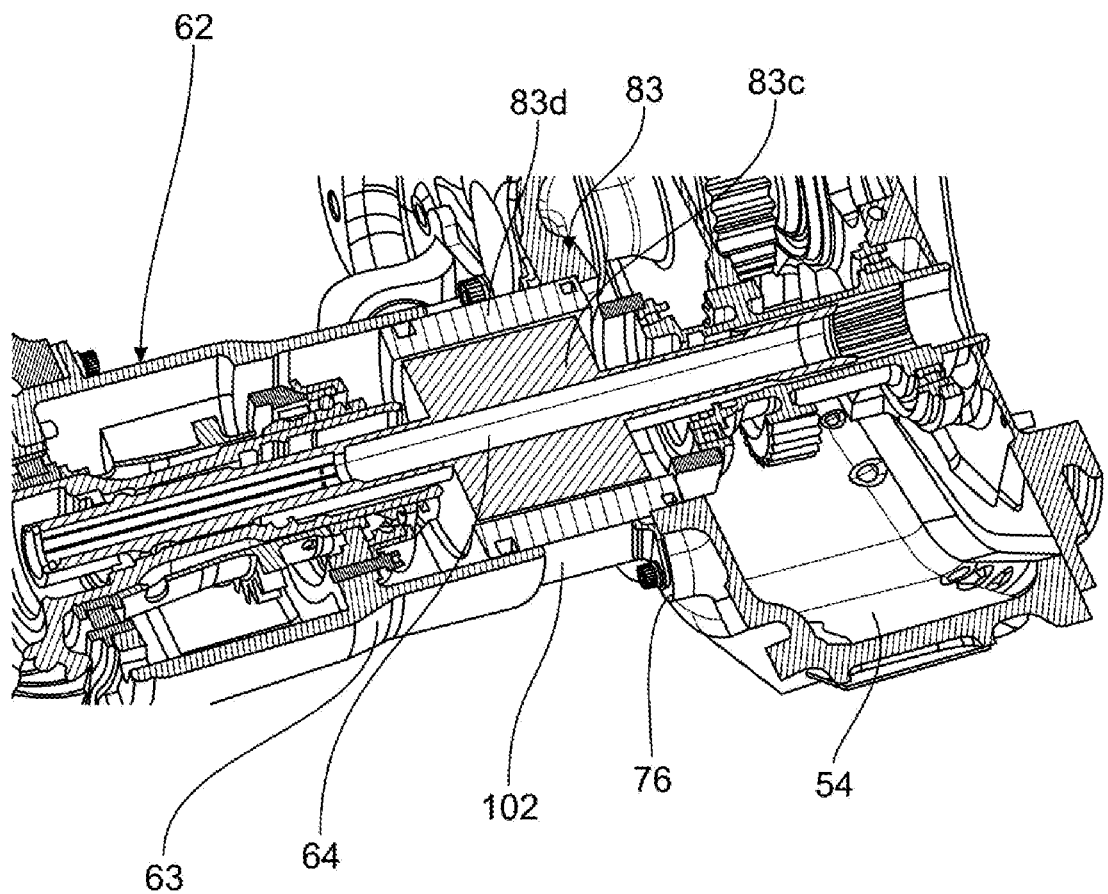
FIG. 6 is a cutaway perspective view of the layout of the electric machine in the sheath surrounding the transfer shaft coupled to the accessory gearbox.

FIGS. 5 and 6 illustrate an optional configuration of the gearbox 58 comprising an additional electric machine 83. As shown in FIG. 5, an external face 76b of one of the side walls, in this case the wall 76, supports a tubular sheath 102 which can surround and be passed through by the transfer shaft 64. The sheath 102 comprises an additional electric machine 83 which is mounted inside the sheath 102. A stator 83d of the additional electric machine 82 is secured in the sheath 102 and a rotor 83c of the electric machine is secured to the transfer shaft 64. The stator 83d of the additional electric machine 83 is naturally mounted around the rotor 83c of the additional electric machine.

As shown in FIG. 6, the sheath 102 is secured to the side wall 76 of the accessory gearbox. It is also received in a sliding manner in a tubular sleeve 63 of the transfer gearbox, so as to absorb the functional clearances of the transfer gearbox 62 and the transfer shaft 64 when the transfer gearbox 62 is coupled to the gearbox 58 and to absorb the clearances resulting from the expansion of these parts during operation.

The mounting is therefore simplified, since all that needs to be done during the mounting is to secure the sheath 102 fitted with the stator 83d to the accessory gearbox 58, then secure the rotor 83c to the transfer shaft 64 and finally insert the transfer shaft 64 fitted with its rotor 83c into the sheath 102.

The disclosure therefore enables us to benefit from a turbomachine whose hybridization is achieved internally to the accessory gearbox, with a gearbox 58 that can be housed compactly close to the central area of the turbomachine.

The invention claimed is:

1. An accessory gearbox for an aircraft turbomachine, the gearbox comprising a casing defining an enclosure which houses at least one gear train comprising a series of pinions, the casing comprising two flat and opposite parallel side walls between which are mounted shafts supporting each of the pinions of the gear train,
   the side walls of the casing each receiving accessories which each comprise a shaft passing through one of the walls and which is coupled to the shaft supporting one of the pinions of the gear train, and one of the side walls being configured to be passed through by a transfer shaft of a power transmission device of the turbomachine which is coupled to a shaft supporting one of the pinions of the gear train,
   the side walls of the casing delimiting in the enclosure an internal volume which surrounds a shaft supporting at least one pinion, referred to as a hybridization pinion, the shaft being configured to be surrounded by an electric machine in the gearbox, the machine comprising at least one rotor and one stator, and
   the rotor of the electric machine being supported by the shaft supporting the hybridization pinion of the gear train and the stator, extending around the rotor, is mounted within the enclosure in the internal volume, wherein the rotor comprises a face coming into abutment on a portion of the hybridization pinion.

2. The gearbox according to claim 1, wherein the shaft of the hybridization pinion is mounted so as to rotate in the casing between two bearings, each of the two bearings being supported by one of the side walls, the shaft of the hybridization pinion comprising a first section comprising the hybridization pinion, arranged close to a first of the bearings, and a second section which extends between the hybridization pinion and a second opposite bearing, the rotor being secured to the second section.

3. The gearbox according to claim 2, wherein the second section of the shaft is in one piece with the first section.

4. The gearbox according to claim 2, wherein the hybridization pinion comprises a web which has a diameter greater than the second section of the shaft of the hybridization pinion and which supports, at an external periphery, meshing toothing, the rotor extending axially from the web towards the second bearing, an outer surface of the rotor being recessedly arranged from a free end of the shaft receiving an inner ring of the bearing.

5. The gearbox according to claim 4, wherein the rotor and the second section of the shaft of the hybridization pinion are rotationally connected.

6. The gearbox according to claim 4, wherein the hybridization pinion comprises, at the free end of the first section of the shaft, a first end collar receiving at least one inner ring of one of the bearings.

7. The gearbox according to claim 1, wherein the shaft supporting the hybridization pinion is tubular and comprises a bore which is coaxial with an orifice formed in one of the adjacent side walls, the bore comprising internal splines for coupling with a shaft of one of the accessories secured to the adjacent wall.

8. The gearbox according to claim 1, wherein an external face of one of the side walls supports a tubular sheath which is configured to surround and be passed through by the transfer shaft, and in that it comprises an additional electric machine that is mounted inside the sheath.

9. The gearbox according to claim 8, wherein a stator of the additional electric machine is secured to the sheath and in that a rotor of the additional electric machine is secured to the transfer shaft, the stator of the additional electric machine being mounted around the rotor of the additional electric machine.

10. An aircraft turbomachine comprising a power transmission device comprising:
- a radial drive shaft securely mounted to rotate with a main shaft of the turbomachine,
- a transfer gearbox coupled to the drive shaft,
- a transfer shaft coupled to the transfer gearbox, and
- the accessory gearbox according claim 1, which is coupled to the transfer shaft.

* * * * *